(12) United States Patent
Pollitt et al.

(10) Patent No.: US 11,346,475 B2
(45) Date of Patent: May 31, 2022

(54) ELECTRICAL ISOLATOR

(71) Applicant: Crompton Technology Group Limited, Solihull (GB)

(72) Inventors: Will Pollitt, Kenilworth (GB); James William Bernard, Brackley (GB)

(73) Assignee: CROMPTON TECHNOLOGY GROUP LIMITED, Solihull (GB)

( * ) Notice: Subject to any disclaimer, the term of this patent is extended or adjusted under 35 U.S.C. 154(b) by 135 days.

(21) Appl. No.: 16/719,597

(22) Filed: Dec. 18, 2019

(65) Prior Publication Data
US 2020/0318764 A1 Oct. 8, 2020

(30) Foreign Application Priority Data

Apr. 2, 2019 (EP) .................................... 19275042

(51) Int. Cl.
*F16L 25/02* (2006.01)
*H05F 1/00* (2006.01)

(52) U.S. Cl.
CPC .............. *F16L 25/025* (2013.01); *H05F 1/00* (2013.01)

(58) Field of Classification Search
CPC .......... F16L 25/01; F16L 25/02; F16L 25/025
See application file for complete search history.

(56) References Cited

U.S. PATENT DOCUMENTS 4,147,381 A * 4/1979 Schwarz ................. F16L 25/03
4,654,747 A * 3/1987 Covey ..................... F16L 25/03
5,131,688 A * 7/1992 Tricini .................... F16L 25/03
5,280,965 A * 1/1994 Schwarz ................. F16L 25/03
(Continued)

FOREIGN PATENT DOCUMENTS

DE        2702925 A1    7/1978
EP        3153756 A1    4/2017
(Continued)

OTHER PUBLICATIONS

Extended European Search Report for International Application No. 19275042.0 dated Oct. 10, 2019, 10 pages.
(Continued)

*Primary Examiner* — Zachary T Dragicevich
(74) *Attorney, Agent, or Firm* — Cantor Colburn LLP

(57) ABSTRACT

An electrical isolator comprising: a first fluid-carrying member and a second fluid-carrying member spaced apart from said first fluid-carrying member; a resistive, semi-conductive or non-conductive component located between said first and second fluid-carrying member, wherein said resistive, semi-conductive or non-conductive component is adapted to convey fluid flowing from said first fluid-carrying member to said second fluid-carrying member; wherein said first fluid-carrying member comprises a first annular projection extending radially outwardly, and said second fluid-carrying member comprises a second annular projection extending radially outwardly such that an annular cavity is formed between the first and second annular projections; wherein the electrical isolator further comprises: a layer of circumferentially wound fiber-reinforced polymer in the annular cavity; and a layer of helical wound fiber-reinforced polymer extending over the first annular projection, the annular cavity and the second annular projection.

12 Claims, 3 Drawing Sheets

(56) References Cited

U.S. PATENT DOCUMENTS

| | | | |
|---|---|---|---|
| 6,271,302 B1 | 8/2001 | Matsushima | |
| 8,248,748 B2 | 8/2012 | Ciolczyk et al. | |
| 9,618,148 B2 | 4/2017 | Breay et al. | |
| 9,746,117 B2 | 8/2017 | Hansom et al. | |
| 9,857,003 B2* | 1/2018 | Bouey | |
| 2006/0099843 A1* | 5/2006 | Fullner | F16L 25/02 |
| 2012/0056416 A1 | 3/2012 | Briand | |
| 2013/0099490 A1* | 4/2013 | Kwon | F16L 25/01 |
| 2017/0103832 A1 | 4/2017 | Chase et al. | |

FOREIGN PATENT DOCUMENTS

| | | | |
|---|---|---|---|
| FR | 2359357 A1 | 2/1978 |
| WO | 2009087372 A2 | 7/2009 |

OTHER PUBLICATIONS

EPO Official Letter for Application No. 19275042.0, dated Mar. 10, 2022, 6 pages.

\* cited by examiner

ELECTRICAL ISOLATOR

FOREIGN PRIORITY

This application claims priority to European Patent Application No. 19275042.0 filed Apr. 2, 2019, the entire contents of which is incorporated herein by reference.

FIELD

The present disclosure relates generally to an electrical isolator, and more specifically to an electrical isolator for use in a hydraulic fluid line for an aircraft. The electrical isolator may be used for connecting two fluid-carrying members such as pipes, hoses or tubes, for example pipes conveying hydraulic fluid.

BACKGROUND

Aircraft and other vehicles contain a large number of fluid conveying systems, in particular hydraulic systems that comprise fluid conveying components such as pipes. Such components are typically metallic and have good electrical conductivity.

Devices are incorporated into such systems to form electrical isolators between the metallic components. These isolators prevent build-up of electrostatic charge by safely dissipating static build up, and also prevent excessive electrical current flowing through the system, for example due to a lightning strike. Both of these events could cause a fire hazard if such isolators were not present in the system.

When incorporated into a fluid conveying system, the electrical isolator also needs to act as a safe passage for fluid. In certain systems, for example hydraulic systems or hydraulic fluid lines in an aircraft, the isolator needs to be able to withstand high pressures, in addition to other load and environmental factors.

The present disclosure is aimed at balancing the above factors to provide an electrical isolation function within a pressurised fluid system.

EP 3153756 describes such an electrical isolator in which a reinforcing composite is provided over the top of a resistive component. The reinforcing composite is made partially conductive by adding a conductive additive to the resin so as to control the conductivity across the electrical isolator such that it can dissipate static build up while not being a primary conduction path in the event of a lightning strike.

SUMMARY

In accordance with an aspect of the disclosure, there is provided an electrical isolator. The isolator includes: a first fluid-carrying member and a second fluid-carrying member spaced apart from said first fluid-carrying member; and a resistive, semi-conductive or non-conductive component located between said first and second fluid-carrying member, wherein said resistive, semi-conductive or non-conductive component is adapted to convey fluid flowing from said first fluid-carrying member to said second fluid-carrying member. The first fluid-carrying member comprises a first annular projection extending radially outwardly, and said second fluid-carrying member comprises a second annular projection extending radially outwardly such that an annular cavity is formed between the first and second annular projections. The electrical isolator further comprises: a layer of circumferentially wound fiber-reinforced polymer in the annular cavity; and a layer of helical wound fiber-reinforced polymer extending over the first annular projection, the annular cavity and the second annular projection.

In accordance with another aspect of the disclosure there is provided a method of forming one or more electrical isolators, said method comprising: connecting a first fluid-carrying member to a second fluid-carrying member using a resistive, semi-conductive or non-conductive component such that said resistive, semi-conductive or non-conductive component is able to convey fluid flowing from said first fluid-carrying member to said second fluid-carrying member; winding a layer of circumferential fiber in an annular cavity formed between a first annular projection extending radially outwardly from said first fluid-carrying member and a second annular projection extending radially outwardly from said second fluid-carrying member; and winding a layer of helical fiber over the first annular projection, the annular cavity and the second annular projection.

The layer of circumferentially wound fiber (also referred to as "hoop" fiber) provides additional pressure resistance to the joint. Hoop fiber is wound with a high angle to the axis of the structure such that it is wound in a very tight helix (or in some cases, even wound directly over itself, i.e. at ninety degrees to the axis). As such, hoop fiber cannot expand under radial pressure and is therefore strong against radial loads, i.e. it is pressure resistant. Such an electrical isolator with a layer of hoop fiber is better adapted to the high pressures of hydraulic systems.

While circumferential fiber is well-suited to providing pressure resistance, it is not well-suited to holding the joint together as it does not provide much strength in the axial direction. However, the layer of helical wound fiber provided radially outwardly of the circumferential fiber does provide axial strength. As this layer is wound over the annular projections provided on the first and second fluid-carrying members, the layer of helical fiber provides axial compression on these two projections and thus holds the two fluid-carrying members and the resistive, semi-conductive or non-conductive component all tightly together.

When helical fiber is wound over the top of circumferential fiber, it also has a tendency to squash the underlying circumferential fiber as it compresses radially as well as axially. If the circumferential fiber is distorted in an axial direction, it loses its shape which makes winding subsequent layers problematic. Providing the circumferential fiber in an annular cavity formed between the two annual projections means that the circumferential fiber is contained against axial spreading and is thus retained in the area of the joint so as to provide the required pressure resistance with an efficient quantity of circumferential fiber. This also ensures a consistent surface to turn the fiber around on.

Circumferential fiber here means fiber with a high winding angle (the angle that the fiber makes with the axis of the part (usually mounted on a mandrel) during winding), typically from 80 degrees up to 90 degrees, more preferably at least 85 degrees.

Helical fiber here means fiber with a low winding angle, typically between 30 degrees and 70 degrees. It is often difficult to wind fiber at angles below about 30 degrees, while angles above 70 degrees do not provide the required axial strength. Lower angles are however still viable, down to essentially 0 degrees if fiber placement can be achieved. Even true axial fiber can be used instead of helical fiber (i.e. fiber with an angle of 0 degrees to the axis, i.e. parallel to the axis), but placement of such fiber is difficult.

In some examples the layer of helical wound fiber-reinforced polymer may be partially electrically conductive.

This conductivity provides for dissipation of static electricity, but the conductivity can be controlled such that it does not provide a primary conduction path in the event of a lightning strike.

The conductivity of the layer of helical wound fiber-reinforced polymer may be controlled by the addition of a conductive additive. Any suitable conductive additive may be used. However in some preferred examples the conductive additive is carbon black or carbon nanotubes.

It will be appreciated that the circumferential fiber-reinforced polymer could also be made partially conductive. In some examples this will not be necessary as the helical fiber-reinforced polymer is in electrical contact with both the first and second fluid-carrying members and therefore provides the required conductive path such that it is not necessary to add any conductive filler to the circumferential fiber-reinforced polymer. In other examples adding conductive filler may be preferable, e.g. to achieve the desired electrical properties.

Such an isolator therefore uses a reinforcing composite encircling the first fluid-carrying member, second fluid-carrying member and non-conductive component, whilst providing a conductive path through the reinforcing composite, but not the component sealing the two fluid-carrying members. This provides a device that effectively dissipates charge build-up and electrically isolates the junction between two fluid-conveying devices, whilst providing a strong joint to withstand high pressures.

The conductive additive may be present in the resin mixture in an amount up to or at least 30%, 20%, 10%, 5%, 2% or 1% of the resin mixture by weight or volume. The resin and/or fiber may be present in the reinforcing composite in an amount up to or at least 30%, 40%, 50%, 60%, 70%, 80% or 90% of the reinforcing composite by weight or volume.

In some examples the layer of circumferentially wound fiber-reinforced polymer extends radially outwardly to at least a radial extent of the first and second annular projections. While it will be appreciated that in some examples it could extend to a lesser radial extent than the projections, this is accompanied by a risk of creating a void between the circumferentially wound fiber and the helical fiber that is wound over the projections. Therefore it is preferred that the circumferential fiber layer extends radially outwardly at least as far as the projections. In most designs it will be desirable for both projections to be the same height. However, if for any reason there is a difference in height then it would be preferred to wind the circumferential fiber to at least the height (radial extent) of the higher projection. The circumferential fiber could be wound to a greater radial extent than the projections, e.g. to provide more pressure resistance.

The projections could have any suitable shape. However, in some examples the first and second annular projections taper from a relatively small thickness and/or outer diameter to a relatively large thickness and/or outer diameter when moving towards said resistive, semi-conductive or non-conductive component.

The layer of helical wound fiber-reinforced polymer preferably extends axially past each of the tapered projections, when moving in a direction away from the resistive, semi-conductive or non-conductive component. This can provide a secure structure that holds captive the first fluid-carrying member, second fluid-carrying member and resistive, semi-conductive or non-conductive component. As the helical wound fiber layer progresses from a small diameter (the outer diameter of the first fluid-carrying member) at one end, through a larger diameter (the joint including the resistive, semi-conductive or non-conductive component together with the hoop fiber layer and the projections) and back to a small diameter (the outer diameter of the second fluid-carrying member) at the other end, it securely holds the joint together.

Thus in preferred examples said layer of helical wound fiber-reinforced polymer extends axially past each of said first and second tapered annular projections of said first and second fluid-carrying members when moving in a direction away from the resistive, semi-conductive or non-conductive component.

The surface on which the circumferential fiber is to be wound, within the annular cavity, may be formed from a combination of the first and second fluid carrying members and the resistive, semi-conductive or non-conductive component. However, in some examples it is convenient that the whole of that winding surface between the projections is formed by the outer diameter of the resistive, semi-conductive or non-conductive component. Thus in certain preferred examples the resistive, semi-conductive or non-conductive component extends axially across the whole width of the annular cavity. This provides a uniform and consistent surface on which to wind the circumferential fiber. Further, as it is the region of the resistive, semi-conductive or non-conductive component that normally requires the most strength from the circumferential fiber, keeping the width of the circumferential fiber layer and the width of the resistive, semi-conductive or non-conductive component equal is efficient in terms of materials and therefore weight. Further, as the projections preferably form the side walls of the cavity and as the projections also define the axial extent of the over-wound helical fiber layer, this arrangement also minimises the overall axial extent of the joint and thus again minimises materials and weight.

In some examples, the side of the projection that forms the wall of the cavity (i.e. the side closest to the resistive, semi-conductive or non-conductive component and thus the side opposite the aforementioned tapered side) is formed perpendicular to the axis of the fluid carrying members and the resistive, semi-conductive or non-conductive component, i.e. substantially perpendicular to the outer diameter of the resistive, semi-conductive or non-conductive component that forms the bottom of the annular cavity.

In preferred examples the electrical isolator further comprises: a sacrificial layer of fiber-reinforced polymer provided radially outwardly of said layer of helical wound fiber-reinforced polymer. The sacrificial layer provides an outer surface that can be machined so as to shape the isolator for attachment to other structures (e.g. support structures within an aircraft). The sacrificial layer ensures that such machining does not damage the underlying helical fibers which could reduce the axial strength of the joint. This outer sacrificial layer may optionally be made from circumferentially wound fiber-reinforced polymer and it may optionally be provided with partial conductivity, e.g. by inclusion of a conductive filler as discussed above.

The first fluid-carrying member and the second fluid-carrying member may be metallic.

The first fluid-carrying member and/or second fluid-carrying member and/or resistive, semi-conductive or non-conductive component and/or reinforcing composite may be tubular. The first fluid-carrying member and/or second fluid-carrying member and/or resistive, semi-conductive or non-conductive component and/or reinforcing composite may each have substantially the same cross-section, for example circular cross-section.

Alternatively, the first fluid-carrying member and/or second fluid-carrying member and/or resistive, semi-conductive or non-conductive component and/or composite layers (helical and circumferential) may each have other shapes and cross-sections, such as a square, rectangular, triangular or irregular cross-section.

The diameter of the first fluid-carrying member and/or second fluid-carrying member and/or resistive, semi-conductive or non-conductive component and/or fiber-reinforced polymer layers may be at least or no more than 5 mm, 10 mm, 15 mm, 20 mm, 25 mm, 30 mm, 35 mm, 40 mm, 45 mm, 50 mm, 60 mm, 70 mm, 80 mm, 90 mm or 100 mm.

The thickness of the first fluid-carrying member and/or second fluid-carrying member and/or resistive, semi-conductive or non-conductive component and/or fiber-reinforced polymer layers may be at least or no more than 1 mm, 2 mm, 3 mm, 4 mm, 5 mm or 10 mm.

The first fluid-carrying member, the second fluid-carrying member and the resistive, semi-conductive or non-conductive component may have a substantially constant internal diameter. This can reduce the amount of sloshing that fluid experiences as it travels through the isolator, in turn reducing build-up of static charge.

In preferred examples no air gap or other material is present between said layer of helical wound fiber-reinforced polymer and said first fluid-carrying member and said second fluid-carrying member. This ensures that the helical wound fiber contacts the first and second fluid-carrying members and directly compresses them together against the resistive, semi-conductive or non-conductive component for good joint strength and stability.

In accordance with an aspect of the disclosure, there is provided a hydraulic system or hydraulic fluid line, for example in an aircraft, comprising an electrical isolator as described above. It has been found that the technology disclosed herein is particularly suitable for electrically isolating components under a high pressure, for example that experienced in a hydraulic system, such as greater than 1000, 2000 or 3000 psi. In other aspects there is provided a fuel system or fuel line, for example in an aircraft, comprising an electrical isolator as described above.

It will be appreciated that any suitable fiber placement techniques may be used for forming both the circumferential (hoop) wound fiber layer and the helical or axial wound fiber layer. Examples of suitable techniques include filament winding, braiding, advanced fiber placement, resin transfer moulding, etc.

It will also be appreciated that any suitable types of fiber may be used. For example the fiber may comprise glass fiber, carbon fiber or aramid fibers.

The fiber-reinforced polymer may be formed from a polymer matrix such as a resin, with the fibers embedded therein. The resin mixture may comprise a resin that may be a thermoset polymer (e.g. epoxy) or a thermoplastic polymer (e.g. polyether ether ketone—"PEEK").

It will also be appreciated that the fiber placement techniques may include adding the resin to the fibers at any suitable time, e.g. before, during or after the placement of the fibers.

Further, while it will be appreciated that different resins could be used for the different fiber layers, it is preferred in some examples to use the same resin for improved bonding between the layers. Additionally, while the different layers may be cured separately, it is preferred to cure both layers together simultaneously so as to chemically bond the two layers together by polymeric cross-linking.

In any of the aspects of embodiments described herein, the first fluid-carrying member and the second fluid-carrying member may be configured to carry or convey fluid, and are not limited to any specific geometry or cross-section. The first fluid-carrying member, the second fluid-carrying member, and the resistive, semi-conductive or non-conductive component may be coaxial with one another.

The helical fiber-reinforced polymer layer encircles the first and second fluid-carrying members, but typically just the end portions thereof, e.g. closest to the resistive, semi-conductive or non-conductive component. The helical fiber-reinforced polymer layer may be a continuous tube that extends from the first fluid-carrying member (or an end portion thereof) and over the resistive, semi-conductive or non-conductive component (and the circumferential wound fiber-reinforced polymer layer) to the second fluid-carrying member (or an end portion thereof).

The helical fiber-reinforced polymer layer may have a varying cross-sectional area and/or inner diameter and/or outer diameter. Alternatively, the helical fiber-reinforced polymer layer may have a constant or substantially constant cross-sectional area and/or inner diameter and/or outer diameter and/or thickness. The cross-sectional area of the helical fiber-reinforced polymer layer may change by no more than 5%, 10%, 15%, 20%, 30%, 40%, 50%, 100%, 200%, 300%, 400% or 500% over the course of its length.

The electrical isolator may further comprise one or more first seals located between cooperating surfaces of the first fluid-carrying member and a first end of the resistive, semi-conductive or non-conductive component. The electrical isolator may further comprise one or more second seals located between cooperating surfaces of the second fluid-carrying member and a second end of the resistive, semi-conductive or non-conductive component. The cooperating surfaces may be formed by overlapping the fluid-carrying members with the resistive, semi-conductive or non-conductive component, e.g. by inserting one of said components partially inside the other. The cooperating surfaces may then by an outwardly facing surface (i.e. an outer diameter) of the first (or second) fluid carrying member and an inwardly facing surface (i.e. an inner diameter) of the first (or second) end of the resistive, semi-conductive or non-conductive component. In such arrangements the resistive, semi-conductive or non-conductive component partially surrounds each of the first and second fluid-carrying components. Equally the cooperating surface may be an inwardly facing surface (i.e. an inner diameter) of the first (or second) fluid carrying member and an outwardly facing surface (i.e. an outer diameter) of the first (or second) end of the resistive, semi-conductive or non-conductive component. In such arrangements the resistive, semi-conductive or non-conductive component is partially surrounded by each of the first and second fluid-carrying components.

Locating the seals between the surfaces as described above can provide the optimum location at which to seal the assembly. The dimensions of the cooperating surfaces may be such that the one or more first and second seals are pressed against the opposing surface when assembled.

The one or more first and second seals may be configured to fluidly seal the resistive, semi-conductive or non-conductive component to the first fluid-carrying member and the second fluid-carrying member.

BRIEF DESCRIPTION OF THE DRAWINGS

Certain preferred examples will now be described, by way of example only, and with reference to the accompanying drawings in which.

DETAILED DESCRIPTION

The present disclosure relates to electrical isolators, which may be used in aircraft hydraulic systems or hydraulic fluid lines in order to provide a strong fluid carrying structure whilst controlling induced electric current (e.g. by lightning) and dissipation of electrostatic charge. Such electrical isolators may also be used in fuel lines, e.g. in aircraft.

Figure 1:
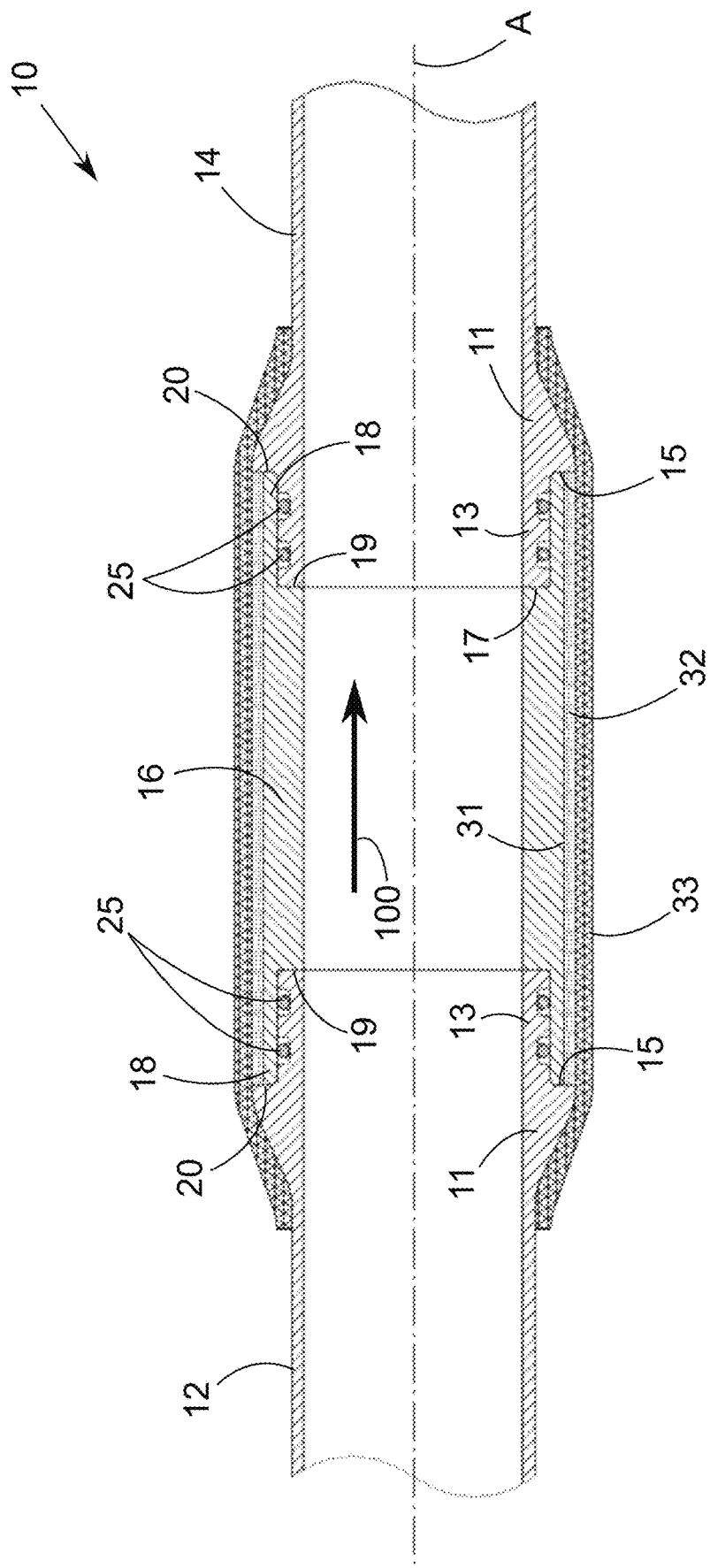
FIG. 1 shows a cross-section of an electrical isolator in accordance with an example of the present disclosure.

FIG. 1 shows a cross-section of an electrical isolator or fluid carrying element 10 according to an embodiment of the present disclosure.

The electrical isolator 10 forms part of a fluid conveying network, such as a hydraulic fluid network in an aircraft. Fluid, for example hydraulic fluid, may flow through the electrical isolator 10 in the direction of arrow 100.

The electrical isolator 10 comprises a first pipe 12 and a second pipe 14. Both the first pipe 12 and the second pipe 14 may be metallic. In the illustrated example the first pipe 12 and the second pipe 14 have the same structure. The first and second pipes 12, 14 are opposed and spaced apart from one another to provide a gap therebetween.

In the illustrated embodiment the first pipe 12 and second pipe 14 are tubular, i.e. cylindrical in shape and having a circular cross-section. Other shapes and cross-sections are possible. Whilst in FIG. 1 the first pipe 12 and second pipe 14 are shown as coaxial, this is not essential and embodiments are envisaged in which the axes of the first pipe 12 and second pipe 14 are at an angle with respect to each other. The angle may be less than 90, 60, 30, 15, 10 or 5 degrees, for example.

Both the first pipe 12 and the second pipe 14 terminate in a shoulder portion 11. The shoulder portion 11 has an increased outer diameter and/or thickness compared to the portion of the respective pipe 12, 14 that is adjacent to it. The shoulder portion 11 comprises a radially extending surface 15 which is perpendicular to the axis A of the pipe and an annular flange 13 extending axially from the radially extending surface 15. Each annular flange 13 terminates at a respective radially extending surface 17.

A resistive, semi-conductive or non-conductive component or liner 16 is located between the first pipe 12 and the second pipe 14. The liner 16 connects the first pipe 12 to the second pipe 14 and maintains a fluid path (see arrow 100) therebetween. The liner is shown as tubular in FIG. 1, and coaxial with the first pipe 12 and second pipe 14. Other configurations are possible, for example if the axes of the first pipe 12 and second pipe 14 are at an angle with respect to each other as discussed above. The liner 16 is resistive, semi-conductive or non-conductive such that it does not itself conduct or transfer electric current between the first pipe 12 and the second pipe 14.

Each axial end of the liner 16 comprises a radial surface 19 and an annular flange 18 extending axially from the radially extending surface 19 (i.e. extending perpendicular to the axis A of the liner 16). The annular flanges 18 of the liner 16 terminate at radially extending surfaces 20.

The respective flanges 13 of the first pipe 12 and second pipe 14 are configured to fit and/or slide into respective flanges 18 of the liner 16. Alternatively, the respective flanges 18 of the liner 16 may be configured to fit and/or slide into the respective flanges 13 of the first pipe 12 and the second pipe 14. As such, the radially extending surfaces 17 of the first pipe 12 and second pipe 14 contact and oppose the radially extending surfaces 19 of the liner 16. Similarly, the radially extending surfaces 15 of the shoulder portion 11 contact and oppose the radially extending surfaces 20 of the annular flanges 18 of the liner 16.

The inner diameter of the liner 16 may be the same as that of the first pipe 12 and the second pipe 14. This can assist in reducing disturbances to fluid flowing through the electrical isolator 10.

The shoulder portions 11 of the first pipe 12 and/or second pipe 14 may be shaped so as to taper from a relatively small outer diameter to a relatively large outer diameter, when moving towards the end of the respective pipe 12, 14 (or towards the liner 16). The shoulder portions 11 thus form a tapered projection that comprises a ramp whose outer diameter increases when moving towards the end of the respective pipe 12, 14 (or towards the liner 16). The ramp may terminate at the radially extending surface 15, which may define the point at which the shoulder portions 11 have the largest outer diameter.

The liner 16 is fluidly sealed against both the first pipe 12 and the second pipe 14 using one or more sealing members 25. In the illustrated embodiment, the sealing members 25 are annular "O" rings and two are provided for sealing each of the first pipe 12 and the second pipe 14. The annular rings sit within respective grooves on the annular flanges 13 of the first pipe 12 and second pipe 14. It would be possible to use other amounts or types of seal and in other arrangements, for example provide the grooves on the annular flanges 18 of the liner 16 instead.

The two opposing radially extending surfaces 15 form the walls of an annular cavity 30, the bottom of which is formed by the radially outer surface 31 of liner 16. The liner 16 in this example extends across the whole width of the annular cavity 30 and thus provides a single continuous surface on which to wind a layer 32 of circumferentially wound fiber-reinforced polymer.

The layer 32 of circumferentially wound fiber-reinforced polymer provides good pressure resistance over the joint between the liner 16 and the two pipes 12, 14. In particular, the layer 32 of circumferentially wound fiber-reinforced polymer is located within the annular cavity 30, bounded by the radially extending surfaces 15 which form the walls of the cavity 30. The circumferentially wound fiber-reinforced polymer layer 32 is therefore constrained axially within the cavity 30, thereby retaining its shape and pressure resistance qualities.

In the example shown in FIG. 1, the layer 32 of circumferentially wound fiber extends radially to the same height as the top of the radially extending surfaces 15. Thus the outer diameter of the layer 32 is the same as that of the shoulder portions 11 of the first pipe 12 and second pipe 14, for example where the ramp (tapered projection) terminates at the radially extending surface 15. This creates a smooth transition from the outer surface of the layer 32 to the outer surface of the first pipe 12 and the second pipe 14 and thus provides a good surface over which to lay the layer 33 of axial or helical fiber-reinforced polymer. In other examples the layer 32 may have a height greater than the shoulder portions 11. In such cases the over-winding of the layer 33 may cause some displacement of the circumferential fiber of layer 32, but a significant portion of layer 32 still remains constrained within the annular cavity 30.

Figure 2:
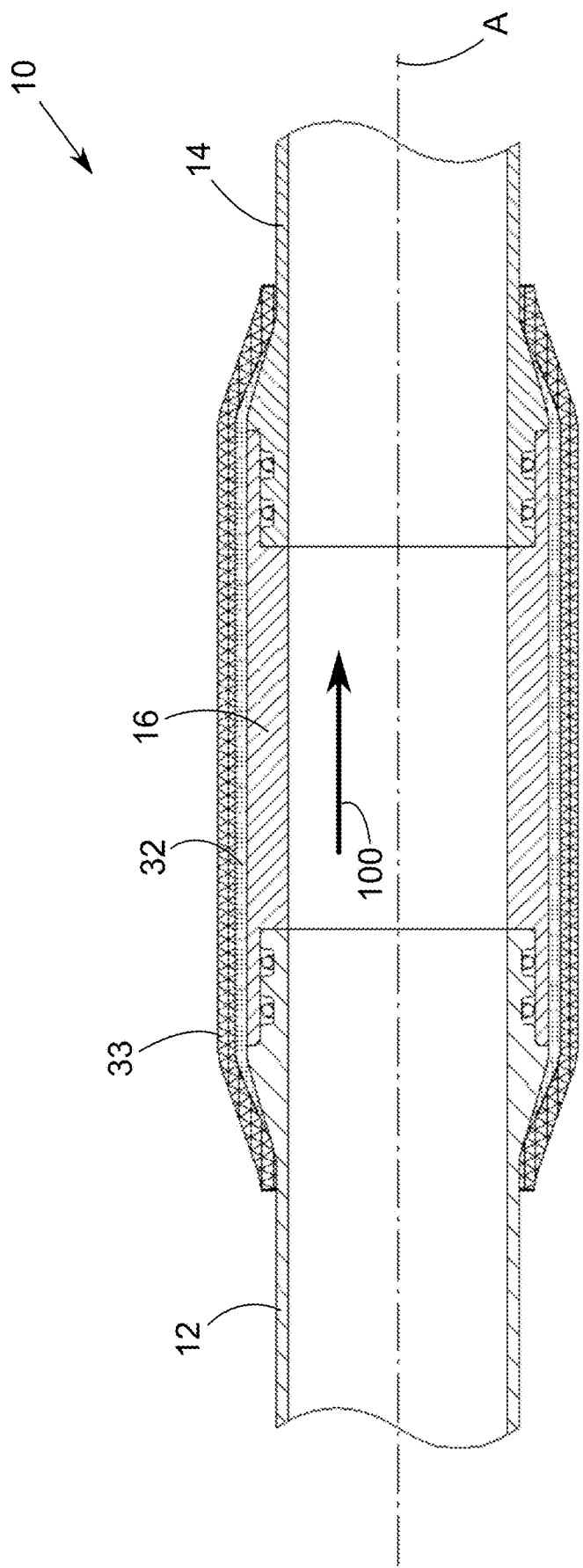
FIG. 2 illustrates the problem of winding over hoop fiber.
Figure 3:
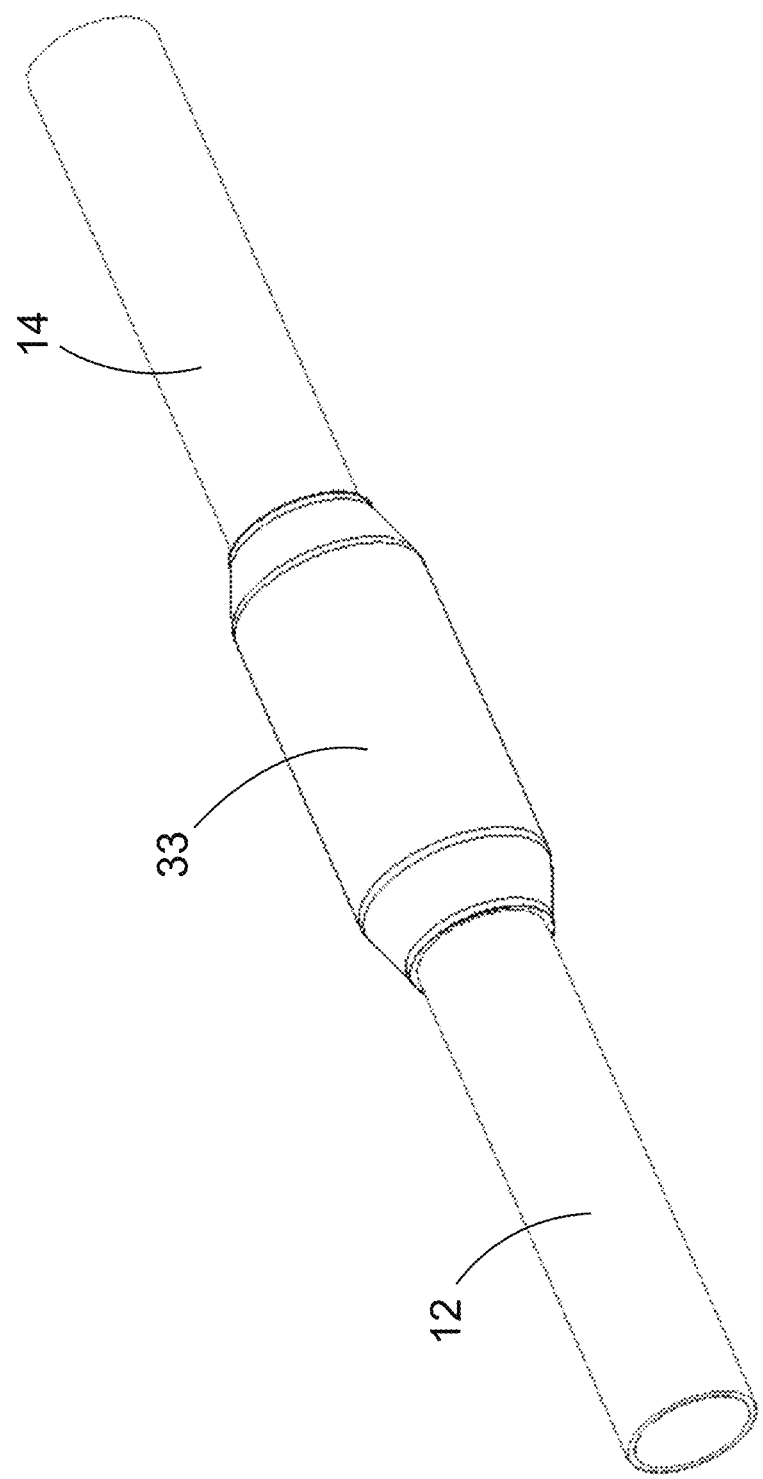
FIG. 3 shows a perspective view of the electrical isolator of FIG. 1.

The problem of fiber displacement that is caused by winding over the top of circumferential fiber is illustrated in FIG. 2. This figure shows the situation that would arise if the layer 32 of circumferential fiber were not constrained within an annular cavity as shown in FIG. 1. Thus, in FIG. 2 the liner 16 takes up the whole of the cavity 30 such that the outer diameter of the liner 16 is flush with the height of the shoulder portions 11. As shown, if the circumferential fiber layer 32 were to be wound over the shoulder 11 and liner 16 in this arrangement, and then the axial or helical fiber 33 were to be wound over the top of the circumferential fiber 32, then the compression caused by the axial or helical fiber 33 causes the circumferential fiber 32 to spread axially. This problem is accentuated by the presence of the ramp on the shoulder portions 11 as the circumferential fiber 32 is squashed down the ramp. As this happens, the thickness and uniformity of the circumferential fiber layer 32 is compromised which in turn compromises its strength and pressure resistance. At the same time, the axial or helical fiber 33 is not in direct contact with the surface of the ramp on the shoulder portion 11 and thus the compressive forces of the layer 33 are not as efficiently transmitted to compressing the joint and holding it all together.

By contrast, turning back to FIG. 1, it can be seen that the axial or helical fiber layer 33 directly contacts the ramp and thus acts directly to compress the pipes 12, 14 and the liner 16 together to form a strong and stable joint. As this arrangement is more efficient in terms of the fiber layers 32, 33 providing the respective forces in the desired directions, the amount of material required for those layers 32, 33 can be minimised, thereby reducing the weight of the part.

It will be appreciated that in the example shown in FIG. 1, the shoulder portions 11 that form the annular projections that in turn form the walls of the annular cavity 30, are formed from the tapered ramp that increases in diameter towards the liner 16, and the radially extending wall 15. The radially extending wall 15 provides good constraint to the layer 32, while the tapered ramp provides a good surface on which to wind the layer 33. However, in other examples, a different profile of annular projection may be used, e.g. with a tapered surface on the side facing the layer 32 and thus constraining the layer 32 and/or a radially extending surface on the side facing away from the layer 32.

The fiber used in either or both of layers 32 and 33 may be glass fiber, carbon fiber or aramid fiber. The resin mixture may comprise a thermoset resin (e.g. epoxy) or a thermoplastic resin (e.g. polyether ether ketone—"PEEK").

The fiber-reinforced polymer layers 32, 33 may consist of, or consist essentially of the fiber and resin mixture. The axial or helical fiber-reinforced layer 33 may be continuous and cover all of the first pipe 12, second pipe 14 and circumferential fiber layer 32 with no air gap and/or other material in between. The first pipe 12 and second pipe 14 may comprise a surface coating or treatment, and the surface coating or treatment may be the only material between the first pipe 12 or second pipe 14 and the fiber-reinforced layer 33.

The axial or helical fiber-reinforced polymer layer 33 extends axially past the shoulder portions 11 of the first pipe 12 and the second pipe 14. As such, the internal diameter of the axial or helical fiber-reinforced polymer layer 33 decreases as the layer 33 extends over and hugs the tapering surface of the first and second pipes 12, 14 at the shoulder portion 11.

Due to the axial or helical layer 33 extending axially past the shoulder portion 11, the smallest internal diameter of the layer 33 (i.e. past the shoulder portion 11) may be less than the largest outer diameter of the first pipe 12 and the second pipe 14 (i.e. at the shoulder portion 11). In this manner, the first pipe 12, second pipe 14 and the liner 16 may be held captive by the axial or helical layer 33.

As discussed above, alternatively, or additionally the shoulder portion 11 of the first pipe 12 and/or the second pipe 14 may comprise a protrusion, over which the layer 33 extends.

The resin mixture of the layer 33 comprises a conductive additive, for example carbon black and/or carbon nanotubes, and this can be incorporated into the resin mixture in varying amounts to achieve the desired conductivity for a particular application.

Alternatively, or additionally the desired conductivity could be achieved by varying the amount of fiber or resin mixture in the layer 33. It will be appreciated that the conductivity of the layer 33 is a function of the relative amounts of fiber, resin and additive and these amounts could be varied to provide any desired conductivity. The conductive additive may be present in the resin mixture in an amount between 0-10 wt. %.

The features discussed above provide an electrical isolator achieving a balance of controlling electric current and dissipating electric charge, whilst also being capable of withstanding high pressures. The issue of high fluid pressure is particularly important when incorporating an electrical isolator in a hydraulic fluid line, for example that of an aircraft, which typically operate at a higher pressure, for example greater than 3000 psi, than for example fuel lines, which operate at pressures of about 100 psi.

The electrical isolator can be used in any fluid systems that require controlled electrical resistance. The electrical isolators described herein achieve robust static sealing, resilience to fatigue and electrical continuity.

Use of a conductive composite layer as disclosed herein removes the need for conductive leads that are exhibited in conventional arrangements. At the same time, the arrangements of the present disclosure remove the need for adhesive and surface preparation, unlike adhered bonds which can be hard to manufacture. Using a conductive additive in the resin also means that the resistivity (or conductivity) of the electrical isolator can be tuned during production, by simply varying the amount of conductive additive in the resin.

A method of forming the electrical isolator 10 of FIG. 1 will now be described.

The first pipe 12 and the second pipe 14 may be provided. The first pipe 12 and/or second pipe 14 may form part of a pipe network, or each comprise the end portion of a larger pipe. The electrical isolator 10 may be part of a hydraulic pipe network operating at greater than 1000, 2000 or 3000 psi, for example a hydraulic system or hydraulic fluid pipe in an aircraft.

Ring seals 25 are inserted into respective grooves on the first pipe 12 and second pipe 14. The ends of the first pipe 12 and the second pipe 14 may then be brought close to one another, and the resistive, semi-conductive or non-conductive component or liner 16 may be placed therebetween. The annular flanges 13 of the first pipe 12 and second pipe 14 may be inserted into (or over) the corresponding annular flanges 18 of the liner 16. This forms a connection between the first pipe 12 and the second pipe 14.

Due to the presence of seals 25, the liner 16 is fluidly sealed against the first pipe 12 and the second pipe 14. This allows fluid to flow or be conveyed from the first pipe 12 to the second pipe 14.

A layer 32 of circumferential (hoop) fiber-reinforced polymer is wound onto the outer diameter 31 of liner 16 up to a height (radial extent) level with the outer diameter of the shoulder portions 11. The shoulder portions (annular projections) together with the liner form the annular cavity that constrains the layer 32 from axial spreading. Resin may be applied together with the fiber (e.g. using a prepreg fiber) or may be applied before or after the fiber.

After winding the layer 32 of circumferential fiber, a layer 33 of axial or helical fiber is placed (typically wound) over the top of the first pipe 12, layer 32 and second pipe 14. The layer 33 extends axially such that it completely encompasses the tapered ramp surface of the annular projection of the shoulder portions 11 on each of the first pipe 12 and the second pipe 14. Again, resin may be applied together with the fiber, or may be applied before or after the fiber.

As discussed above, the resin mixture comprises a conductive additive. This can be added and mixed into the resin in varying amounts, to alter or change the conductivity of the composite layer 33 (and optionally also the layer 32).

Finally, the two layers 32, 33 of fiber-reinforced polymer are cured. This hardens the joint and secures the two pipes 12, 14 and the liner 16 together via the compressive forces of the axial or helical fiber layer 33 acting directly on the tapered ramps of the shoulder portions 11.

The method may further comprise passing fluid through the electrical isolator 10, i.e. from the first pipe 12 to the second pipe 14 via the liner 16, at a pressure of greater than 1000, 2000 or 3000 psi.

Although the present disclosure has been described with reference to various embodiments, it will be understood by those skilled in the art that various changes in form and detail may be made without departing from the scope of the disclosure as set forth in the accompanying claims.

The invention claimed is:

1. An electrical isolator comprising:
a first fluid-carrying member and a second fluid-carrying member spaced apart from said first fluid-carrying member;
a resistive, semi-conductive or non-conductive component located between said first and second fluid-carrying member, wherein said resistive, semi-conductive or non-conductive component is adapted to convey fluid flowing from said first fluid-carrying member to said second fluid-carrying member;
wherein said first fluid-carrying member comprises a first annular projection extending radially outwardly, and said second fluid-carrying member comprises a second annular projection extending radially outwardly such that an annular cavity is formed between the first and second annular projections;
wherein the electrical isolator further comprises:
a layer of circumferentially wound fiber-reinforced polymer in the annular cavity; and
a layer of helical wound fiber-reinforced polymer extending over the first annular projection, the annular cavity and the second annular projection; and
wherein the layer of circumferentially wound fibre-reinforced polymer extends radially outwardly to at least a radial extent of the first and second annular projections.

2. The electrical isolator as claimed in claim 1, wherein the layer of helical wound fiber-reinforced polymer is partially electrically conductive.

3. The electrical isolator as claimed in claim 2, wherein the conductivity of the layer of helical wound fiber-reinforced polymer is controlled by the addition of a conductive additive.

4. The electrical isolator as claimed in claim 3, wherein said conductive additive is carbon black or carbon nanotubes.

5. The electrical isolator as claimed in claim 1, wherein the first and second annular projections taper from a relatively small thickness or outer diameter to a relatively large thickness or outer diameter when moving towards said resistive, semi-conductive or non-conductive component.

6. The electrical isolator as claimed in claim 5, wherein said layer of helical wound fiber-reinforced polymer extends axially past each of said first and second tapered annular projections of said first and second fluid-carrying members when moving in a direction away from the resistive, semi-conductive or non-conductive component.

7. The electrical isolator as claimed in claim 1, wherein the resistive, semi-conductive or non-conductive component extends axially across the whole width of the annular cavity.

8. The electrical isolator as claimed in claim 1, further comprising:
a sacrificial layer of fiber-reinforced polymer provided radially outwardly of said layer of helical wound fiber-reinforced polymer.

9. The electrical isolator as claimed in claim 8, wherein said sacrificial layer is formed from circumferentially wound fiber-reinforced polymer.

10. The electrical isolator as claimed in claim 1, wherein said first fluid-carrying member and said second fluid-carrying member are metallic.

11. The electrical isolator as claimed in claim 1, no air gap or other material is present between said layer of helical wound fiber-reinforced polymer and said first fluid-carrying member and said second fluid-carrying member.

12. A method of forming one or more electrical isolators, said method comprising:
connecting a first fluid-carrying member to a second fluid-carrying member using a resistive, semi-conductive or non-conductive component such that said resistive, semi-conductive or non-conductive component is able to convey fluid flowing from said first fluid-carrying member to said second fluid-carrying member;
winding a layer of circumferential fiber in an annular cavity formed between a first annular projection extending radially outwardly from said first fluid-carrying member and a second annular projection extending radially outwardly from said second fluid-carrying member, wherein the layer of circumferentially wound fibre-reinforced polymer extends radially outwardly to at least a radial extent of the first and second annular projections; and
winding a layer of helical fiber over the first annular projection, the annular cavity and the second annular projection.

* * * * *